Figure 1:
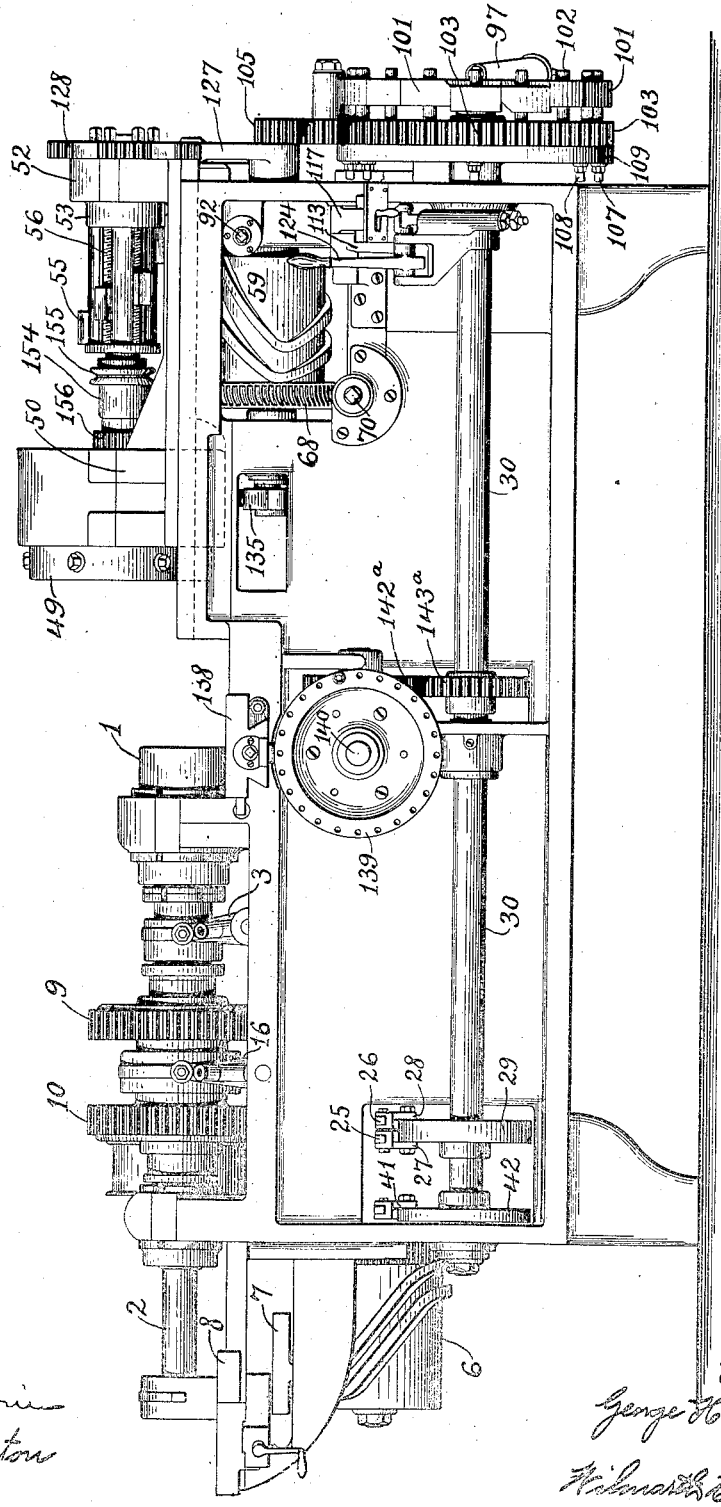

No. 857,893. PATENTED JUNE 25, 1907.
G. H. NEWTON.
SCREW MACHINE.
APPLICATION FILED JUNE 23, 1902.

10 SHEETS—SHEET 2.

No. 857,893. PATENTED JUNE 25, 1907.
G. H. NEWTON.
SCREW MACHINE.
APPLICATION FILED JUNE 23, 1902.

10 SHEETS—SHEET 3.

Witnesses.
W. J. Baldwin.
J. H. Thurston.

Inventor.
George H. Newton
By
Wilmarth H. Thurston
Attorney.

No. 857,893. PATENTED JUNE 25, 1907.
G. H. NEWTON.
SCREW MACHINE.
APPLICATION FILED JUNE 23, 1902.
10 SHEETS—SHEET 4.
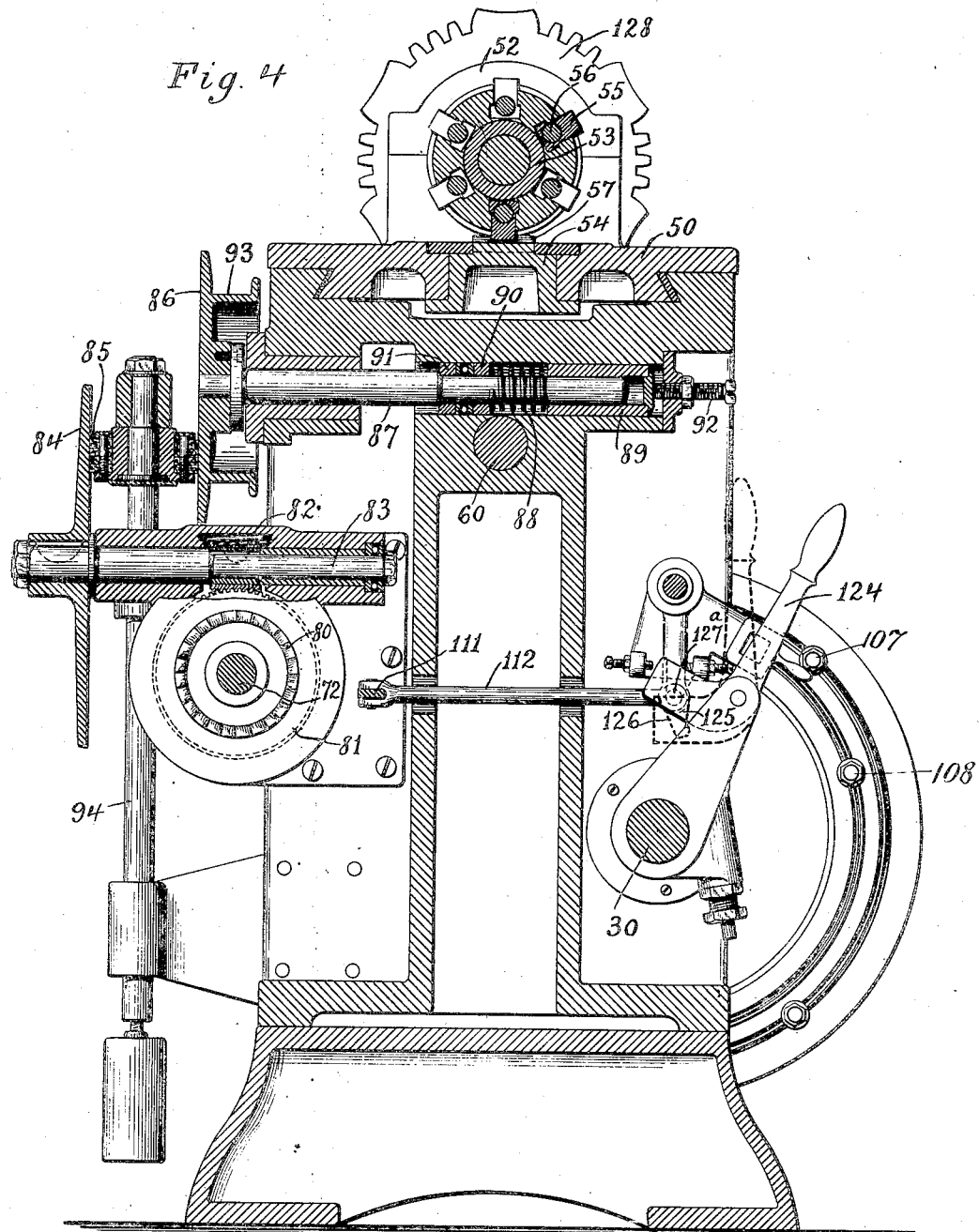

No. 857,893.
PATENTED JUNE 25, 1907.
G. H. NEWTON.
SCREW MACHINE.
APPLICATION FILED JUNE 23, 1902.
10 SHEETS—SHEET 5.
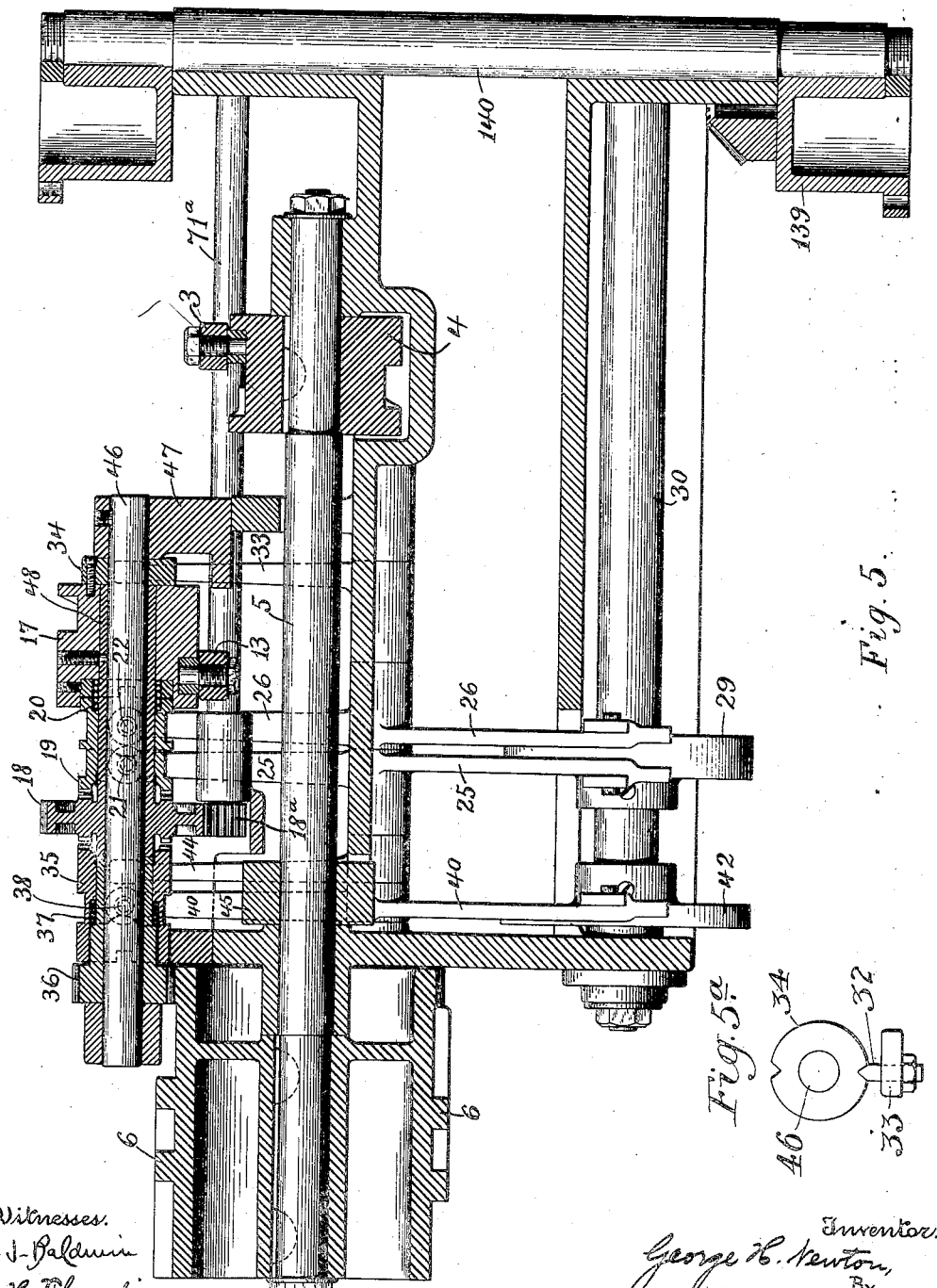
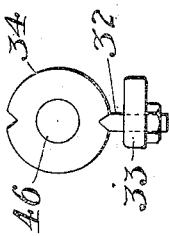
Witnesses.
W. J. Baldwin
J. H. Thurston
Inventor.
George H. Newton,
By
Wilmarth H. Thurston,
Attorney.

No. 857,893. PATENTED JUNE 25, 1907.
G. H. NEWTON.
SCREW MACHINE.
APPLICATION FILED JUNE 23, 1902.

10 SHEETS—SHEET 8.

Witnesses.
W. J. Baldwin
J. H. Thurston

Inventor
George H. Newton
BY
Wilmarth H. Thurston
Attorney.

No. 857,893. PATENTED JUNE 25, 1907.
G. H. NEWTON.
SCREW MACHINE.
APPLICATION FILED JUNE 23, 1902.

10 SHEETS—SHEET 10.

Witnesses:
W. J. Baldwin
J. H. Thurston

Inventor.
George H. Newton
By
Wilmarth & Thurston
Attorney.

UNITED STATES PATENT OFFICE.

GEORGE H. NEWTON, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

SCREW-MACHINE.

No. 857,893.     Specification of Letters Patent.     Patented June 25, 1907.

Application filed June 23, 1902. Serial No. 112,826.

*To all whom it may concern:*

Be it known that I, GEORGE H. NEWTON, of the city and county of Providence and State of Rhode Island, have invented certain new and useful Improvements in Screw-Machines; and I do hereby declare the following specification, taken in connection with the accompanying drawings, forming a part of the same, to be a full, clear, and exact description thereof.

The invention relates to that class of machines commonly called "screw machines" or "turret lathes" in which the screws or other articles being formed are acted upon by a series of tools or devices carried in a revolving holder or turret which is turned upon its axis to bring the devices carried thereby successively into line with the work. These machines are usually provided also with one or more cross slides for carrying cutting off, or forming tools, and in some types of these machines the screws or other articles are formed from a rod of stock held in the jaws of a rotary chuck and intermittently fed forward as the articles are successively completed and severed from the end of the rod.

The features of the present invention have been embodied in this type of machine, although it will be understood that the different features may be embodied in other types of machines which do not have all the characteristics referred to. In this machine the tool turret is mounted upon a reciprocating slide and is reciprocated through the action of a device having a uniform throw or range of action, such for instance as a cam or a crank pin. It is usually, if not always, advantageous however to advance the turret to varying distances for different tools, and one feature of the invention relates to means for accomplishing this result, and consists in providing means for varying the effect of the operating device upon the turret according to the requirements of the different tools. This means preferably comprises a slide which is given a uniform reciprocation and a series of adjustable abutments corresponding to the tools in the turret and successively brought into the path of the slide by the indexing movements of the turret.

A further feature of invention relates to the mechanism for operating the cross slides of which there are two in the machine referred to. These slides are mounted independently and are operated independently by cams secured to drums having their axes parallel with the movement of the slides. This arrangement enables a simple and compact connection between the cross slide and its operating cam, such for instance as a roll on the slide directly engaging the cam. The cam is removably and adjustably secured to the drum, and the roll on the slide is also preferably adjustable for the purpose of getting fine and accurate adjustments with convenience and quickness.

Further features of invention relate to the devices for locking and indexing the turret, to the devices for advancing the turret with varying speeds for different tools, and to other combinations and arrangements of parts which contribute to the efficiency and simplicity of the machine and which will be more particularly pointed out in the claims.

Figure 2:
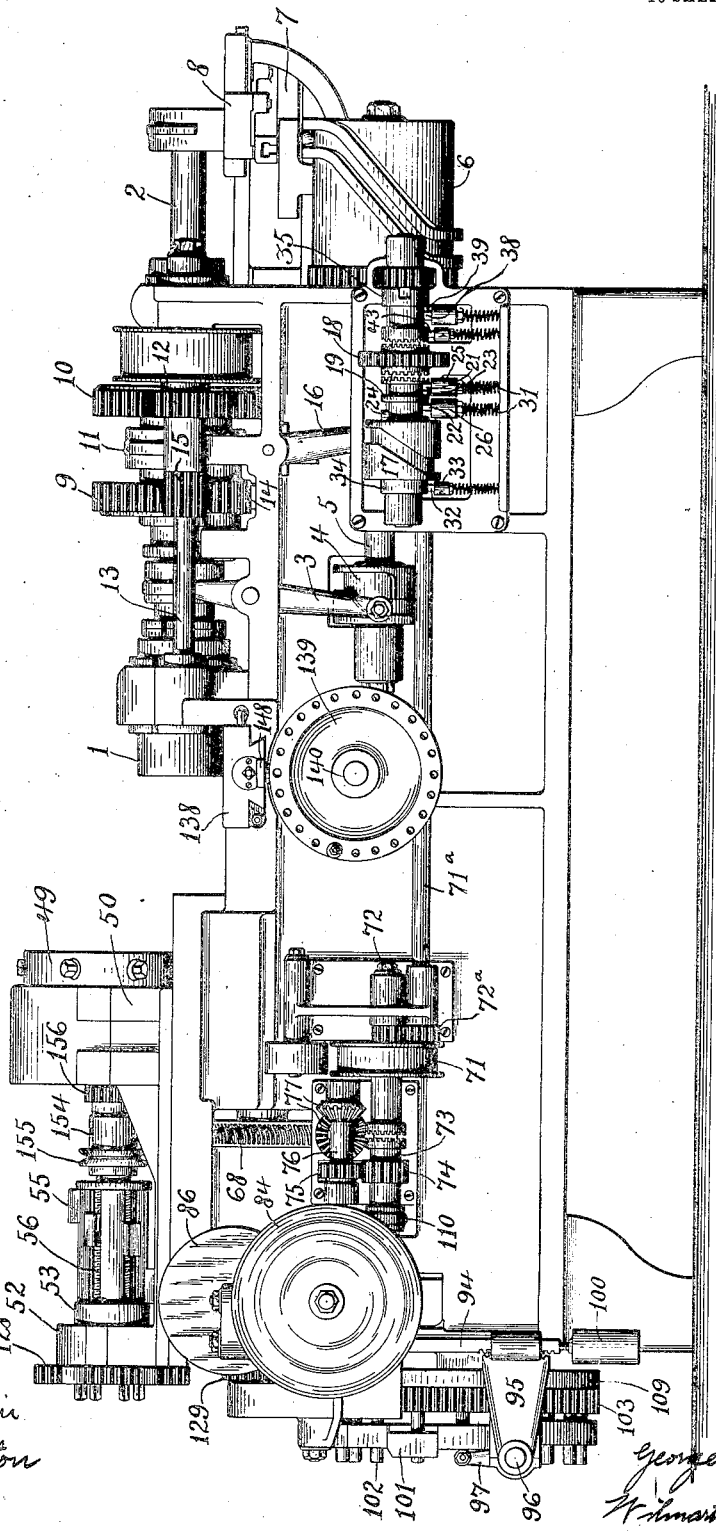
Figure 3:
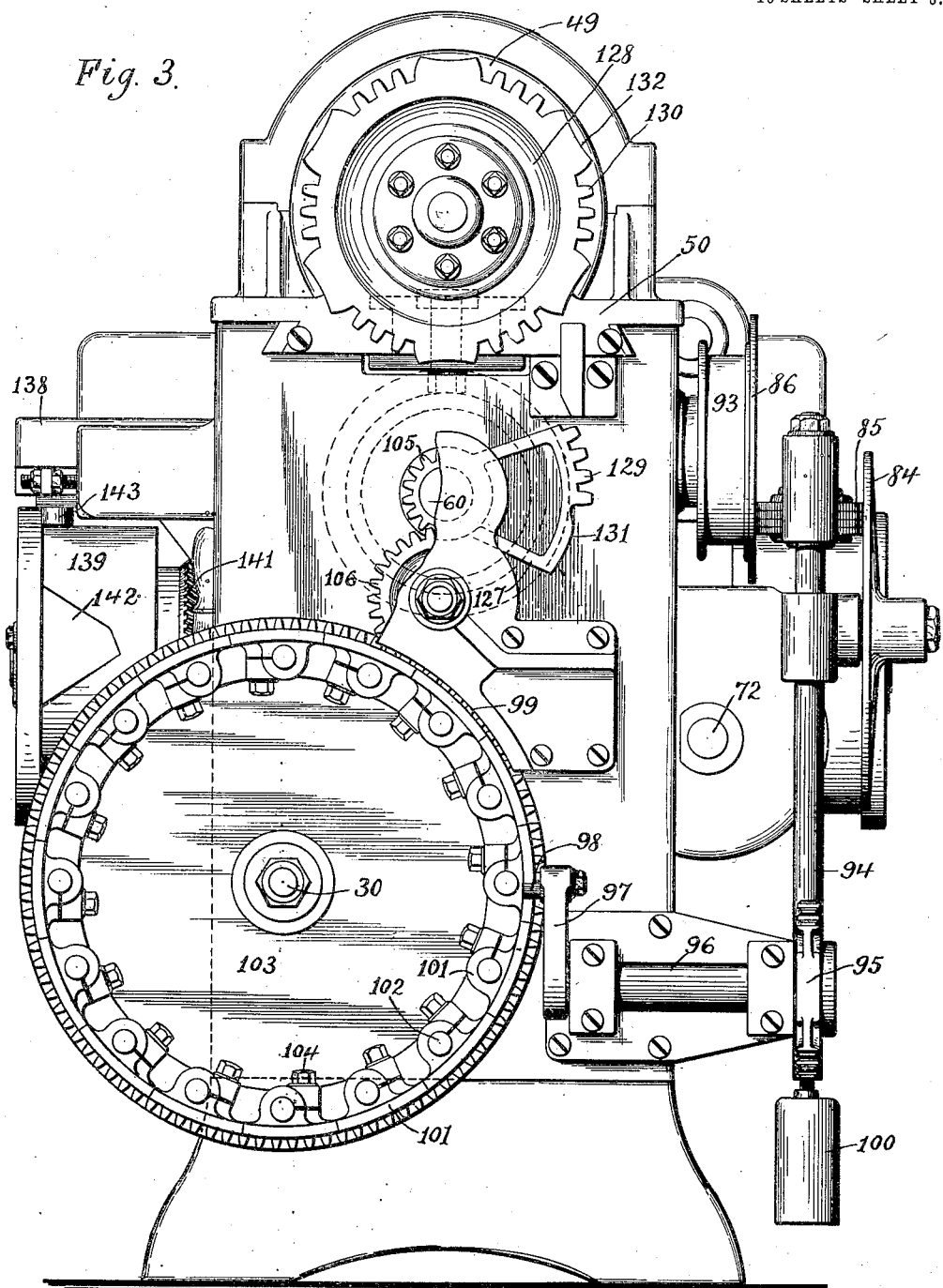
Figure 6:
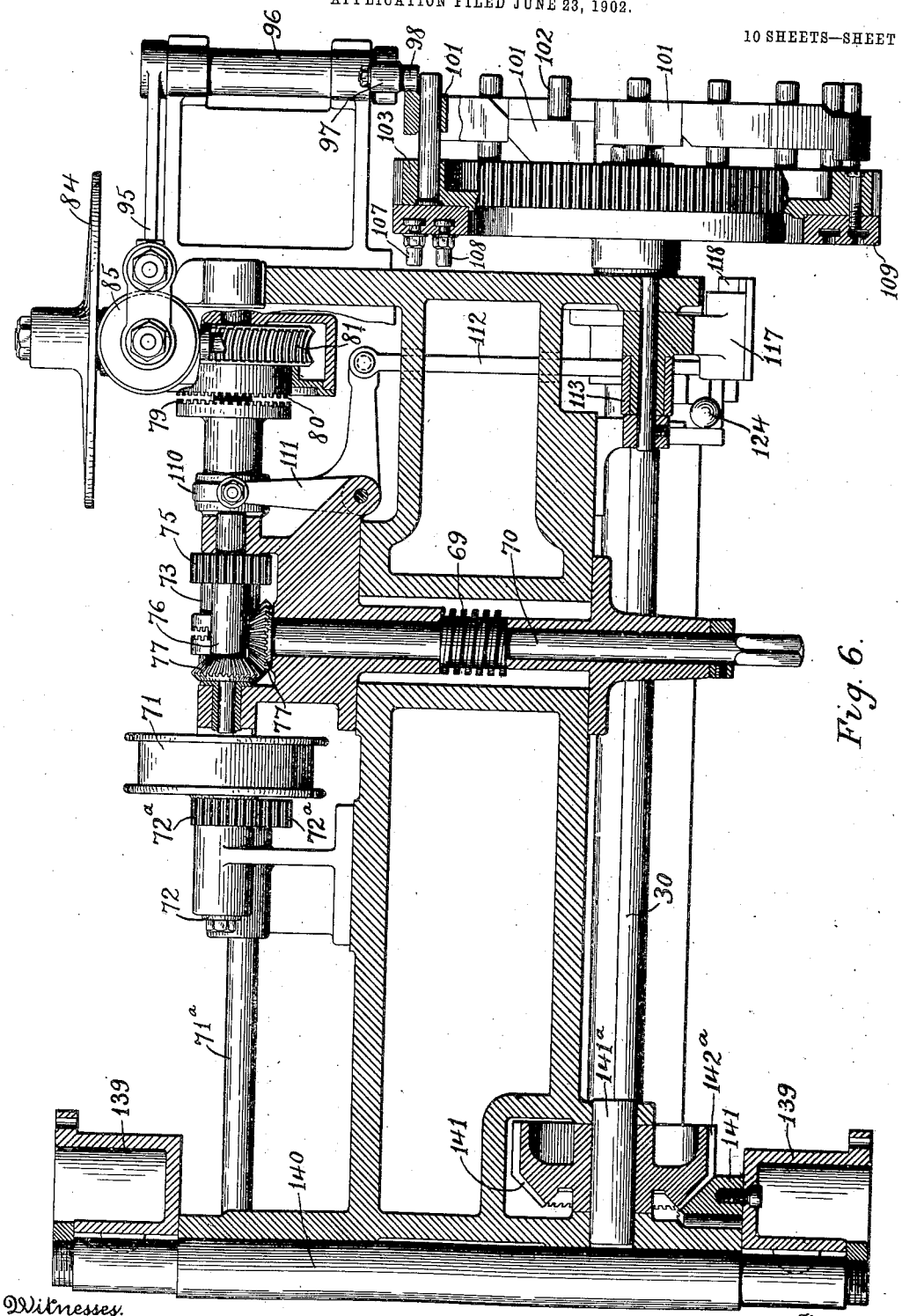
Figure 7:
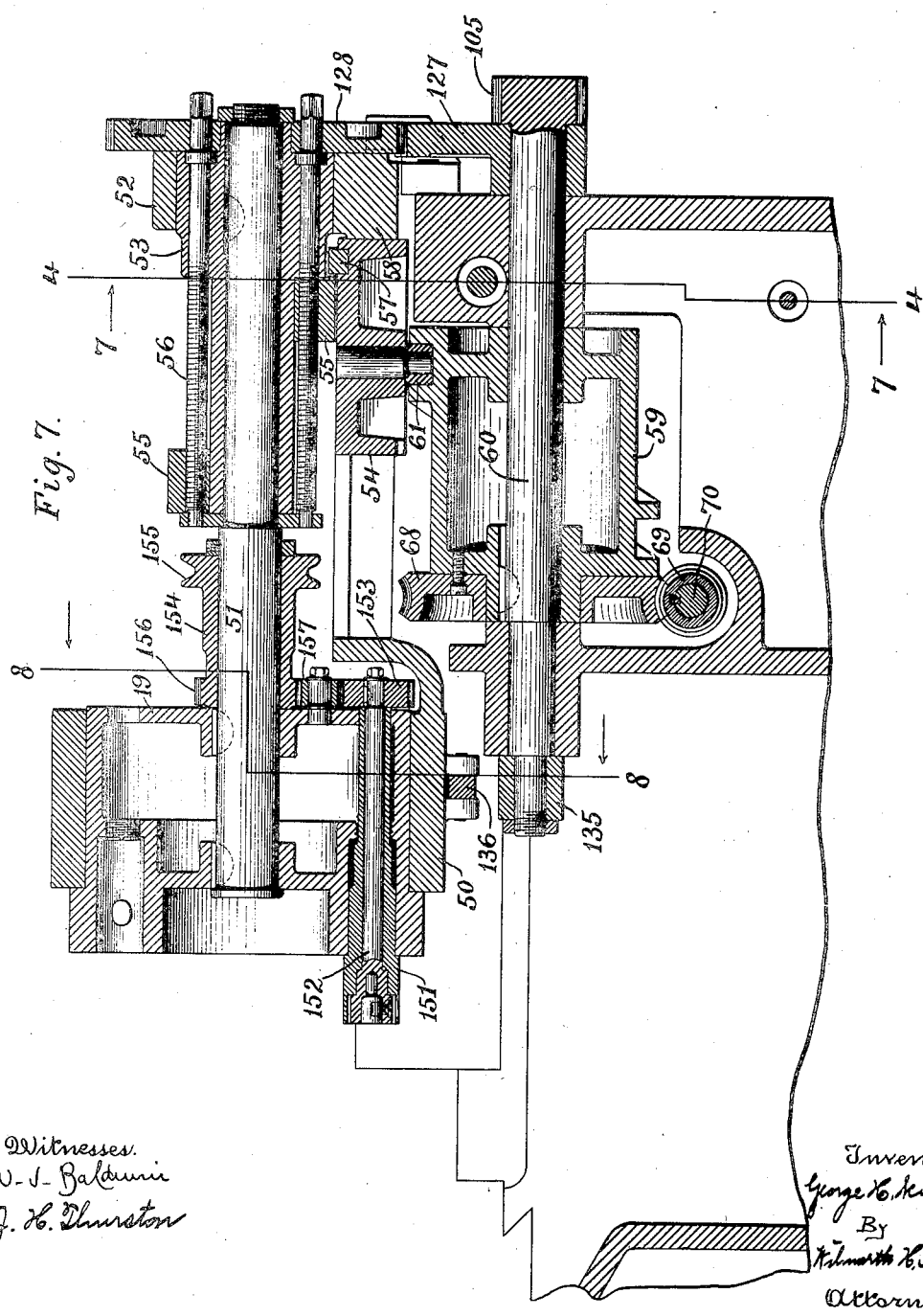
Figure 8:
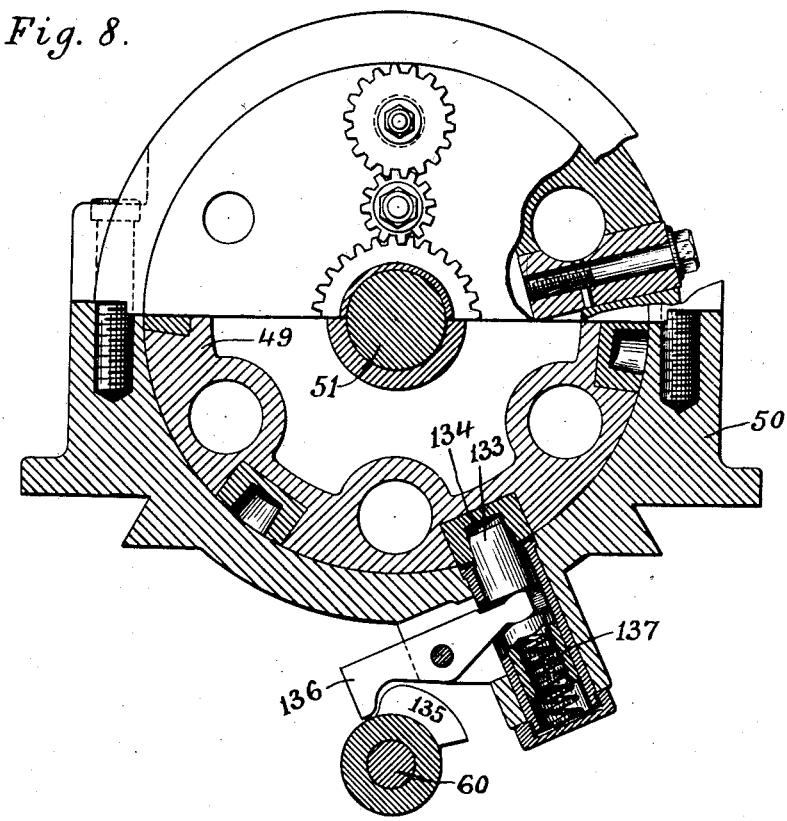
Figure 14:
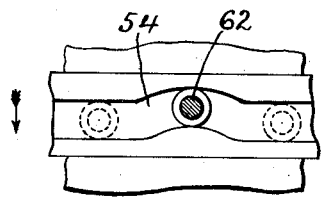
Figure 9:
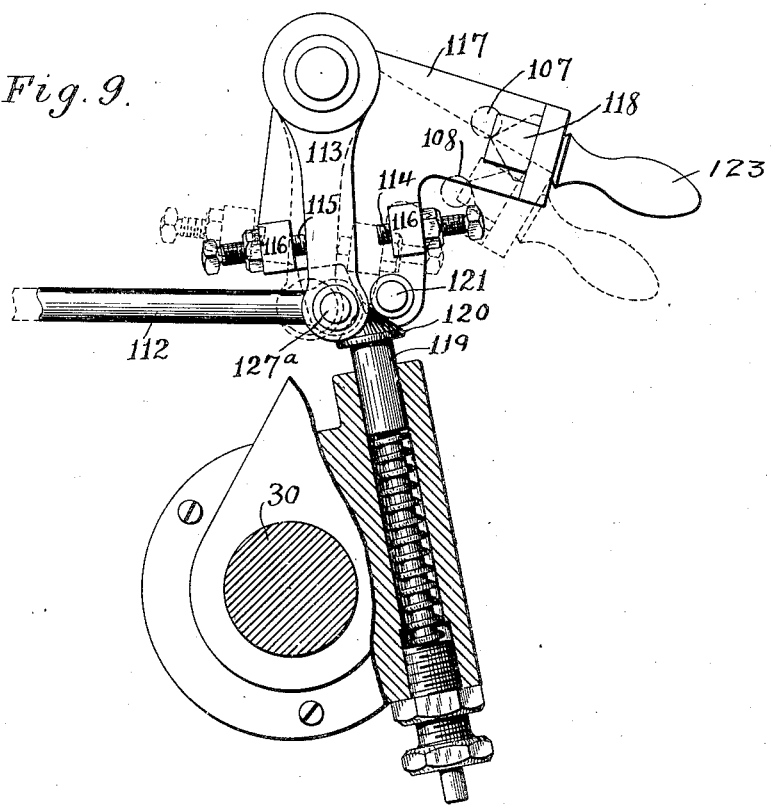
Figure 10:
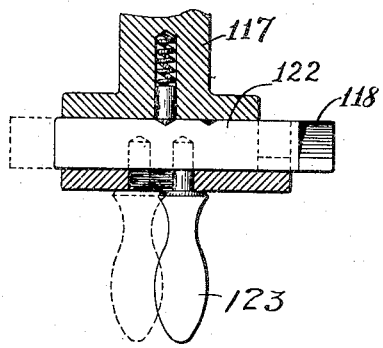
Figure 11:
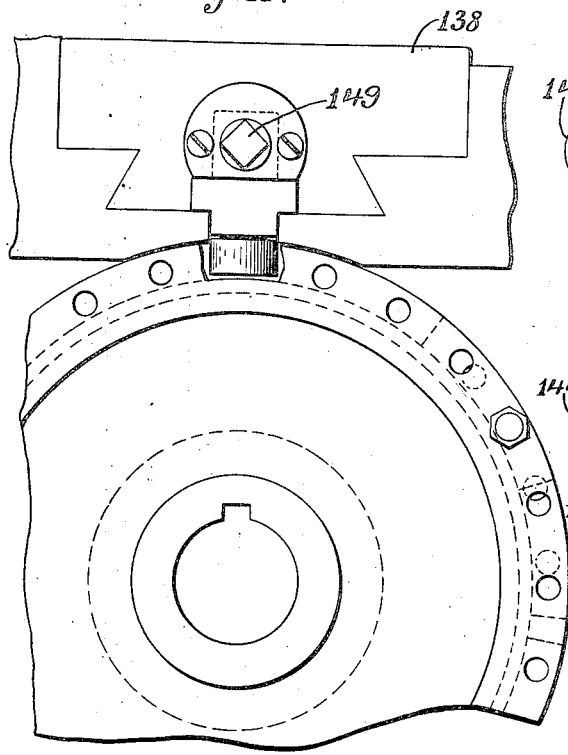
Figure 12:
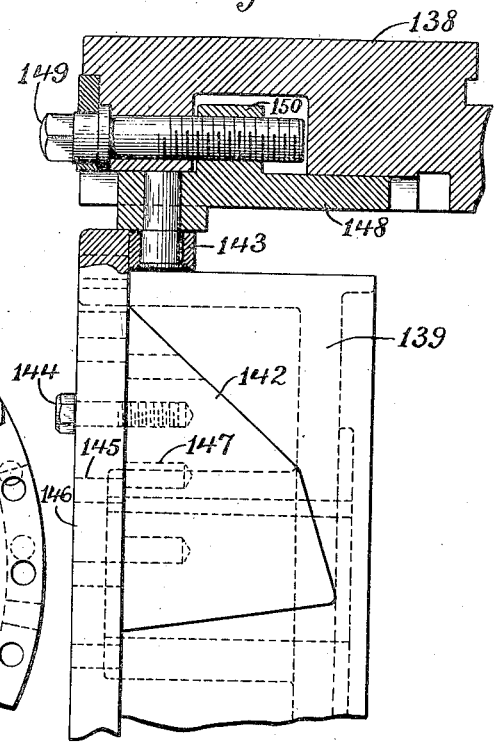
Figure 13:
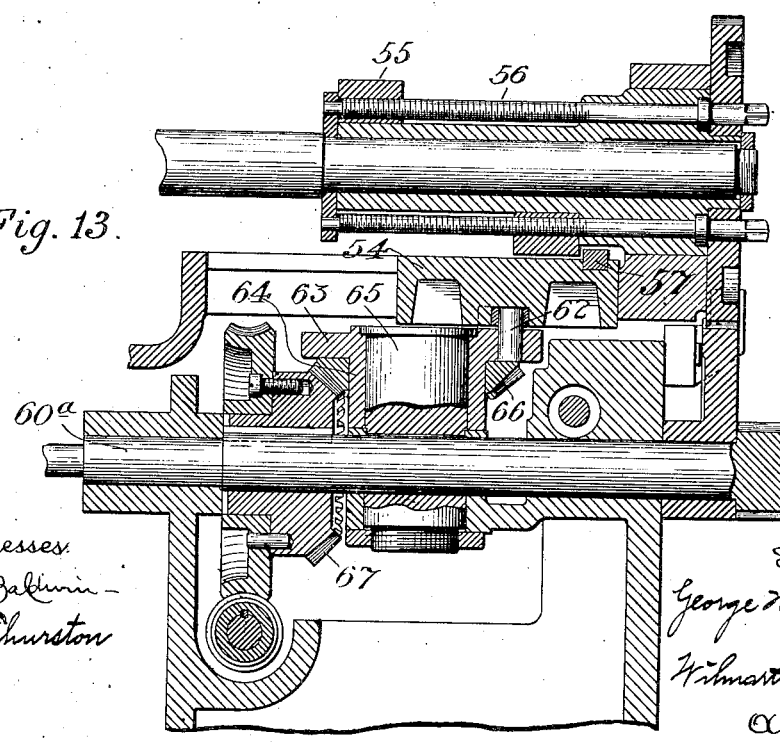

In the drawings Figure 1 is a front elevation of an automatic screw machine embodying all the various features of the invention, Fig. 2 is a rear elevation, Fig. 3 is an end view, Fig. 4 is a cross sectional view on line 4—4, Fig. 7, Figs. 5 and 6 are horizontal sectional views, Fig. 5$^a$ is a detail of the locking pin 32, Fig. 7 is a vertical sectional view through the axis of the turret, Fig. 8 is a sectional view on line 8—8, Fig. 7, Figs. 9 and 10 are details of the clutch shipping mechanism, Figs 11 and 12 are details of the cross slide and operating cam, Fig. 13 is a view of a second form of turret operating mechanism, and Fig. 14 is a view showing the groove in the slide for connecting the turret slide and its operating means.

In the machine shown the articles are formed from a rod of stock held in the jaws of a chuck carried by the spindle 1, the rod being fed forward after the completion of each article by a feeding tube 2. The construction of the chuck and the feeding tube may be of any well known construction, such for instance as shown in the patent to S. R. Worseley, granted July 30, 1895, No. 543,606.

The lever 3 for opening and closing the jaws of the chuck is operated by a cam 4 secured to an intermittently rotating cam shaft 5. The cam 6 which reciprocates the feed tube 2 is also secured to the shaft 5 and this cam is connected with the feed tube through a lever 7 and slide 8 similar to the lever and slide shown in the patent to W. S. Davenport, No. 604,306, May 17, 1898, the lever and slide in the present machine being arranged horizontally instead of vertically, as in the patent.

The spindle is driven in either one direction or the other through one of two gears 9 and 10 loosely mounted on the spindle and adapted to be connected therewith by a clutch 11. The gear 10 is driven through a pinion 12 secured to the driving shaft 13 and revolves in the opposite direction to shaft 13 while gear 9 is driven in the same direction as shaft 13 through an intermediate gear 14 which engages gear 9 and a pinion 15 secured to shaft 13. The lever 16, which shifts the clutch 11 from one gear to the other to reverse the direction of rotation of the spindle, is operated by a cam 17 which is revolved a half revolution at suitable intervals to shift the clutch first in one direction and then in the other and thus reverse the direction of rotation of the spindle. The mechanism for rotating the cam 17 consists of a constantly rotating gear 18 and a clutch 19 connected with the cam and arranged to be intermittently engaged with a clutch face on the gear. The clutch 19 is in the form of a sleeve connected with the cam by a coupling which allows the sleeve to move longitudinally without being disconnected from the cam. The clutch 19 is pressed toward the gear 18 by a spring 20, and is normally held out of engagement with the gear 18 by one or the other of two abutments 21 and 22 which engage one or the other of two cams 23 and 24 formed on the clutch sleeve and located on diametrically opposite sides of the clutch sleeve. The abutments 21 and 22 are in the form of pins on the ends of levers 25 and 26 which extend transversely of the machine and are operated at the proper times by tappets 27 and 28 adjustably secured to a disk 29 secured to a shaft 30 at the front of the machine. With the parts in the position of Fig. 2 the clutch 19 is held out of engagement by the abutment 21 and cam 23. When the lever 25 is rocked the clutch sleeve is released and is engaged with gear 18 by the spring 20. The clutch and cam 17 now revolve until cam 24 engages abutment 22, when the clutch is again thrown out of engagement with gear 18 and held out until the lever 26 is rocked and the clutch sleeve again released. The levers 25 and 26 are returned immediately after being rocked by springs 31, and the pins 21 and 22 ride on the periphery of the clutch sleeve until engaged by the cams. A pin 32 on the end of a spring pressed arm 33 engages notches in a collar 34 secured to the cam 17 and prevents overrunning of the cam and holds the cam in position. The mechanism for intermittently revolving the cam shaft 5 is somewhat similar to that just described, and consists of a clutch sleeve 35 coupled to a pinion 36 which engages a gear formed on the cam drum 6, the clutch sleeve being arranged to intermittently engage a clutch face on the gear 18. The clutch sleeve 35 is pressed toward the gear by a spring 37 and is normally held out of engagement with the gear by an abutment 38 which engages a cam 39 formed on the clutch sleeve. The abutment is in the form of a pin carried on the rear end of lever 40 the front end of which is arranged to be engaged by a tappet 41 carried by a disk 42 secured to the shaft 30. The clutch sleeve 35 is normally held from rotation by a pin 43 on the end of a spring pressed arm 44 which engages a notch in the clutch sleeve, the pin and notch being similar to the pin 32 and notch shown in Fig. 5ª. When the lever 40 is rocked the clutch 35 engages the gear 18, and the clutch and pinion 36 revolve until the abutment 38 is returned into the path of the cam 39, when the clutch is again disengaged and held until the lever 40 is again rocked. The abutment 38 is held out of the path of cam 39 until the cam shaft 5 has nearly completed a revolution by a cam 45 secured to shaft 5 and arranged to act upon the lever 40. The cam 45 also acts upon the arm 44 and holds the pin 43 out of engagement with the clutch sleeve while the shaft 5 is being rotated. When the shaft 5 has nearly completed a revolution the cam 45 allows the lever 40 to return to normal position so that the cam 39 engages pin 38 and throws the clutch sleeve 35 out of engagement with the gear 18. The shaft 5 now remains at rest until the lever 40 is again rocked. These mechanisms for operating the spindle clutch and rotating the cam shaft 5 are mounted upon a shaft 46 which is secured in a bracket 47 bolted to the frame of the machine. The gear 18, pinion 36, and cam 17 are loosely mounted on the shaft 46 and the gear 18 is held in place between the hub of pinion 36 and a sleeve 48 to which the cam 17 is secured. The clutch sleeve 19 is mounted to slide on the sleeve 48 and the clutch sleeve 35 is mounted to slide on the hub of pinion 36. This forms a simple and compact construction which may be cheaply and conveniently made and assembled, and by mounting the mechanisms in a separate bracket the mechanism may be conveniently assembled and then secured bodily in place.

The rod of stock carried in the jaws of the spindle is acted upon by a series of tools carried in a turret 49 which, as shown, is provided with six tool sockets. The turret is mounted in a turret slide 50 guided in ways in the frame, the turret being arranged with its axis parallel to the axis of the spindle 1. The turret is secured to a shaft 51 which extends rearwardly from the turret and is supported at its outer end in a bearing 52 on the turret slide which surrounds a sleeve 53 secured to the shaft. The turret slide is reciprocated to advance and retract the tools carried by the turret, and the turret is given a partial revolution after each reciprocation to bring the tools successively into position to act upon the rod of stock. The device which reciprocates the turret has a uniform throw, and in case the motion due to the operation of this device is transmitted directly to the turret the turret will be moved through the same distance at each reciprocation, or in other words, the turret will be advanced the same distance for each tool. In such case the length of cut for the different tools will depend on the distance the tools project from the turret, the tools which project to the greatest extent having the longer cut. It is more advantageous, however, to mount the tools close up to the turret and to regulate the length of cut by regulating the distance through which the turret is advanced according to the length of cut required. To enable this to be done, when the device for reciprocating the turret has a uniform thrown, means are provided for regulating the effect of said device on the turret according to the requirements of the respective tools, and a simple and efficient form of such means is that which is embodied in the machine shown. This form of such means consists of a slide 54 mounted in guides formed in the turret slide and operated through the same distance at each reciprocation by the device for reciprocating the turret. The motion of the slide 54 is transmitted to the turret through a series of adjustable abutments in the form of blocks 55 mounted in grooves in the sleeve 53. These blocks are engaged by a series of screw rods 56 having squared ends for receiving an operating wrench by which the screws may be turned to adjust the blocks. The number of blocks corresponds to the number of tool sockets in the turret, and by the indexing movements of the turret the block corresponding to the tool which is brought into operative position is brought into the path of a projection 57 on the slide 54. The distance through which the turret is advanced for any tool will depend on the adjustment of the corresponding block 55, since the forward movement of slide 54 will not be transmitted to the turret until the slide engages the block 55. The turret is returned each time to the same position by the engagement of the slide 54 with a fixed abutment 58 on the turret slide formed by the end of the slot in which the slide 54 is guided.

The device for reciprocating the turret may be of any suitable construction, and I have shown two devices either of which provides a simple and efficient means for reciprocating the turret and each of which has a uniform throw. The device shown in the main views and in Fig. 7 consists of a cam 59 secured to a shaft 60 and having a cam groove which engages a roll 61 on the slide 54 and moves said slide forward and back for each revolution of the cam. The cam groove is so shaped that the slide 54, and consequently the turret slide, remains in its retracted position long enough for the indexing of the turret to be effected.

In Fig. 13 the device for reciprocating the turret consists of a crank 62 which engages a transverse groove in the slide 54 Fig. 14, and advances and retracts the slide for each revolution of the crank. The crank is carried by a disk 63 on the upper end of a sleeve 64 mounted on a fixed stud 65. A bevel gear 66 is secured to the sleeve 64 and is engaged by a similar bevel gear 67 secured to the shaft 60$^a$ corresponding to the shaft 60 in the other construction. The bevel gears are of the same size so that the crank will make one revolution for one revolution of shaft 60$^a$. The groove in slide 54 is provided with a curved central part Fig. 14 which is concentric with the crank disk when the slide 54 is in its rearward position. While the crank is moving in this curved part the slide remains at rest in its retracted position long enough for the indexing to take place. When the slide 54 is being advanced by the crank the curved groove acts to modify the effect of the crank, so that the entire forward movement of the slide is very nearly at a uniform speed.

The shaft 60 (or 60$^a$) is driven through a worm wheel 68 secured to the cam 59 (or gear 67) and engaged by a worm 69 secured to a transverse shaft 70. During the time the tools are operating on the work the shaft 70 is driven at a slow speed to slowly advance the turret, but after a tool has finished its work the shaft 70 is driven at a high speed to quickly retract the turret, index the same, and advance it until the next tool has been brought up to the work. The shaft 70 is driven at a high speed for the above purpose by means of a belt passing over a pulley 71 loosely mounted on a fixed shaft 72. This pulley is provided with a clutch face arranged to be engaged by a clutch face formed on a clutch sleeve 73 also loosely mounted on the shaft 72 and carrying a pinion 74. The pinion 74 engages a pinion 75 secured to a shaft 76 geared to the shaft 70 through bevel gears 77, the pinion 74 having a sufficiently long face to allow longitudinal movement of the clutch sleeve without disengaging the pinions 74 and 75. When the clutch sleeve is engaged with pulley 71 the shaft 70 is driven at a high speed. The pulley 71 also serves to drive the gear 18 through the medium of a shaft 71$^a$ connected with the pulley through gears 72$^a$ and connected with the gear 18 through gear 18$^a$ (Fig. 5).

When the shaft 70 is to be driven at a slow speed the clutch sleeve 73 is shifted to disengage it from the pulley 71 and to bring a clutch face 79 formed on the sleeve into engagement with a clutch face 80 formed on the hub of a slow running worm wheel 81 which is also loosely mounted on the shaft 72.

When the clutch sleeve 73 is in mid-position neither driving mechanism is in operation, and at such time the turret may be operated by a handle applied to the squared end of shaft 70 (Fig. 6).

The speed at which the turret should be advanced during the operation of a tool will depend on the character of the tool and for the most efficient work the machine should be capable of adjustment to vary the speed at which the turret is advanced to suit the requirements of the tool which is to operate upon the work. To give the machine this capacity mechanism is provided for varying the speed of the worm wheel 81, and consequently of the devices for advancing the turret during the operation of the tools, and this mechanism is so constructed that it may be adjusted to give the turret any desired speed of advance at the time any particular tool is operating. The worm wheel 81 is driven through a worm 82 secured to a worm shaft 83 to which is also secured a friction disk 84. The disk 84 is engaged by a friction disk 85 which also engages and is driven by a friction disk 86 secured to a shaft 87, the disk 85 being arranged between the overlapping faces of disks 84 and 86, and being adjustable radially of said disks to vary the speed of the driven disk 84. The driving disk 86 is driven by a belt passing over the pulley 93 formed on said disk, and the disk 86 is forced toward disk 84 by means of a spring 88. The spring 88 is interposed between a bushing 89 which surrounds one end of shaft 87 and a sleeve 90 loose on said shaft and separated from a second sleeve 91 by a series of balls. The sleeve 91 engages a shoulder on the shaft 87. The pressure between the disks may be varied by adjusting the bushing 89, a screw 92 being provided for the purpose.

The intermediate disk 85 is mounted on a rod 94 mounted in suitable bearings and moved vertically to move the disk radially of the disks 84 and 86 through a segment 95 which engages rack teeth formed on the rod. The segment 95 is secured to one end of a rock shaft 96 to the other end of which is secured an arm 97 carrying a pin 98 which engages a cam 99. A weight 100 is secured to the lower end of rod 94 and serves to keep the pin 98 in engagement with the cam 99. The cam 99 is formed by a series of blocks 101 adjustably secured upon a circularly arranged series of pins 102 extending from a disk 103. These blocks are secured in position by clamping bolts 104, and by adjusting the blocks on the pins the configuration of the cam may be adjusted to give the disk 85 any desired position at any particular time in the revolution of the cam 99.

The cam disk 103 is secured upon the outer end of the shaft 30 and made in the form of a gear which is driven from the turret cam shaft 60 through a pinion 105 on said cam shaft and an intermediate gear 106. The pinion 105 and gear 103 are so proportioned that the gear 103 makes one revolution for each complete indexing of the turret, that is, in the present machine the gear 103 makes one revolution for six revolutions of shaft 60. By adjusting the blocks 101 the position of the disk 85, and consequently the speed of advance of the turret during the operation of each tool, may be adjusted to suit the requirement of such tool, thus enabling the machine to be readily adjusted to suit the piece of work to be done.

The clutch sleeve 73 is automatically shifted from the fast to the slow driving mechanism and vice versa through the action of pins 107 and 108 adjustably secured in grooves formed in a ring 109 secured to the disk 103. The pins 107 are arranged to act upon intermediate shifting mechanism to cause the clutch sleeve 73 to engage with the high speed pulley 71, and the pins 108 are arranged to act upon the shifting mechanism to cause the clutch sleeve 73 to be engaged with the slow speed worm wheel 81.

The intermediate shifting mechanism is shown in Figs. 6, 9, and 10. A ring 110 is mounted in a groove in the sleeve 73 and is connected with one end of a bell crank lever 111 the other end of which is connected by means of a link 112 with a rock arm 113. The rock arm 113 is arranged between two screws 114, 115, carried in lugs 116 on a pivoted plate 117 which is swung in one direction or the other to operate the rock arm and thus shift the clutch sleeve. The screws 114 and 115 form adjustable shoulders for engaging the arm 113, and by adjusting these screws the lost motion between the swinging plate and the rock arm may be properly adjusted. The initial movements are given to the plate 117 in shifting the clutch sleeve by the pins 107 and 108 which are arranged to engage opposite sides of a V-shaped cam 118 carried by the plate. The movements of the plate 117 are completed by the action of a spring pressed bolt 119 having a conical head 120 arranged to act upon a pin 121 projecting from the plate 117.

Supposing the clutch sleeve 73 to be in engagement with the worm wheel 81, then the parts will be in the full line position. Fig. 9. Now when a pin 107 engages the upper side of cam 118 it will swing plate 117 to the left. This will bring screw 114 against the side of arm 113, and the same movement of plate 117 causes the pin 121 to ride over the point of the conical head 120, the bolt yielding to allow the movement of the pin. When the center of the pin 121 passes the point of head 120 the left side of the head acts upon the pin 121 and suddenly completes the movement of the plate 117, thus shifting the arm 113 and also shifting the clutch sleeve from worm wheel 81 into engagement with pulley 71. The parts are now in the dotted line position Fig. 9. When a pin 108 now engages the underside of the cam 118, the plate 117 is swung toward the right until the screw 115 strikes the arm 113 and pin 121 passes the point of head 120, when the parts are quickly returned to full line position.

The automatic shifting mechanism may be thrown out of action by moving the slide 122, on which the cam 118 is formed, into the position shown in dotted lines Fig. 10 or full lines Fig. 6, so that the cam is out of the path of pins 107 and 108. The shifting mechanism may be operated manually through a handle 123 carried by the slide 122.

In order that the automatic operation of the turret may be readily stopped a cam lever is provided which will shift the clutch sleeve 73 into mid-position from whatever position it may occupy. This lever 124 (Fig. 4) is provided with two oppositely disposed cam surfaces 125 and 126 arranged to engage a pin 127$^a$ projecting from the rock arm 113. This lever is normally in the dotted line position, Fig. 4, where it will not interfere with the movements of the arm 113. If it is desired to throw the clutch sleeve 73 into mid-position the lever is swung into full line position, and in this movement either cam 125 or 126 acts on pin 127$^a$ and swings the arm 113 into mid-position. This brings the pin into the socket at the intersection of the cams 125 and 126, and the pivot of the lever is so arranged that with the pin in this position the lever acts as a lock to prevent movement of the arm 113 under the influence of spring bolt 119.

The mechanism for indexing the turret to bring the tools carried thereby successively into line with the chuck spindle consists of a segment 127 secured to the shaft 60 and arranged to coöperate with a disk 128 secured to the sleeve 53. The segment 127 is provided with a toothed segment 129 which engages a series of toothed segments 130 formed on the disk 128, and is also provided with a locking segment 131 which engages a series of locking segments 132 on the disk 128. When the turret slide is in its retracted position the disk 128 is in position to be engaged by the segment 127, and the segment is timed to engage the disk as soon as the turret is retracted. The toothed segment 129 engages one of the segments 130 and revolves the turret until the locking segment 131 engages one of the locking segments 132, when the rotation of the turret is stopped and the turret is held in position until the segment 131 has passed by the segment 132.

The turret is held in its indexed positions by means of a locking bolt 133 (Fig. 8) mounted in the turret slide and arranged to engage a series of sockets 134 in the periphery of the turret. The locking bolt is withdrawn just previous to the operation of the indexing mechanism by a cam 135 secured to shaft 60 and arranged to engage one end of a lever 136 the other end of which engages a recess in the bolt 133. The bolt is returned when released by the cam by means of a spring 137.

In addition to the tool carrying turret, the machine is provided with two cross slides 138 upon which additional tools may be secured, and certain features of the invention relate to the devices for operating these slides. These slides are operated independently of each other from cams carried upon cam drums 139 which are secured to a shaft 140 arranged across the machine with its axis parallel to the movements of the slides. The shaft 140 is driven from the shaft 30 through bevel gears 141, one of which is secured to a drum 139 and the other of which is mounted upon a stud 141$^a$ and is formed integral with a spur gear 142$^a$ engaged by a spur gear 143$^a$ on shaft 30. The shaft 140 makes one revolution for each complete indexing of the turret. Each drum 139 carries a cam 142 (Figs. 11 and 12) arranged to engage a roll 143 connected with a slide 138. The cam 142 is held in position by a bolt 144 which passes through one of a series of holes 145 in the flange 146 of the drum and engages one of a series of holes 147 in the edge of the cam. These two series of holes are arranged differently, so that any desired adjustment of the cam may be approximately obtained by bringing different holes in the two series into register. The fine adjustment between the cross slide and its operating cam is effected by adjustment of the roll 143 on the cross slide. For this purpose the roll 143 is mounted upon a slide 148 guided in a groove in the cross slide and adjusted by means of a screw 149 which engages a nut 150 formed on the slide 148. This construction and arrangement provides a simple and effective means for operating a cross slide, or in case two cross slides are used, for operating each slide independently. The arrangement of the cam drum with its axis parallel to the movement of the cross slide enables the use of a simple and direct connection between the cam and slide, and also enables the drums to be located where they are readily accessible for adjusting and changing the cams.

In case it is desired to mount a rotating tool, such as a drill, for instance, in the turret, this may be done by inserting a sleeve 151 in one of the sockets in the turret. This sleeve carries a spindle 152 provided at its front end with means for holding a tool, and provided at its rear end with a pinion 153. For the purpose of driving the spindle 152, a sleeve 154 is mounted on the turret shaft 51 and is provided with a pulley 155 over which a driving belt may be passed. The sleeve 154 also carries a gear 156 which engages a pinion 157 arranged to engage the pinion 153 on the spindle 152. The direction of rotation of the spindle 152 may be varied by using a cross or open belt on the pulley 155, or two intermediate pinions may be mounted on the turret between the sleeve 151 and spindle 152. When the spindle 152 is not to be used it may be removed by taking off the pinion 153 and then removing the sleeve 154.

In general the operation of the machine is as follows: Suppose an article to have been completed and severed from the rod of stock, the tappet 41, Fig. 1, operates the lever 40 so that clutch 35, Fig. 2, engages gear 18, and drives the cam shaft 5 a single revolution. During this revolution the cam 4 acts to open and close the jaws of the chuck and cam 6 acts to advance the feeding tube 2 to feed forward the stock and then return the feeding tube to its rearward position. The turret is then advanced by the cam 59 which is driven during the cutting from the slow speed clutch 80, Fig. 6. When the turret reaches the end of its forward stroke the clutch 73 is shifted into engagement with the high speed pulley 71 by the action of one of the pins 107 on the cam 118, Figs. 6 and 9. The cam 59 and shaft 60 are now driven at a high speed until one of the pins 108 operates on the cam 118 and shifts the clutch 73 into engagement with the slow speed clutch 80. During this time the cam 59 acts to quickly return the turret into its rearward position, the turret locking bolt is withdrawn and the indexing segment acts to index the turret, after which the cam 59 advances the turret until the tool is brought up to the work. At this moment the clutch is shifted to the slow speed drive. The speed of the cam 59 during the action of the successive tools is regulated by the cam blocks 101 on the disk 103 which makes one revolution for each complete indexing of the turret. The cross slides are operated independently and are moved in by their operating cams at the proper times, depending upon the work which they are to do.

What I claim as my invention and desire to secure by Letters Patent is:

1. In a screw machine, the combination, with a turret, of means for reciprocating the same, having a uniform throw, and means for varying the extent to which said reciprocating means moves the turret for different tools, substantially as described.

2. In a screw machine, the combination, with a turret, of a device for reciprocating the same having a uniform throw, and means intermediate said device and the turret for varying the extent to which said device moves the turret for different tools, substantially as described.

3. In a screw machine, the combination, with a turret, of a device for reciprocating the same having a uniform throw, and a series of adjustable devices corresponding to the sockets in the turret for determining the extent to which said device moves the turret, substantially as described.

4. In a screw machine, the combination, with a turret, of a crank for reciprocating the same, and means for varying the extent to which the crank moves the turret for different tools, substantially as described.

5. In a screw machine, the combination, with a turret, of a crank for reciprocating the same, and means for producing a dwell in the movement of the turret at the end of its rearward movement, and for modifying the action of the crank during the advance of the turret, substantially as described.

6. In a screw machine, the combination, with a turret, of a crank for reciprocating the same, a slide intermediate the crank and turret provided with a transverse groove shaped to produce a dwell in the movement of the slide at the end of its rearward movement, and a series of adjustable abutments for connecting the turret and slide in different indexed positions of the turret, substantially as described.

7. In a screw machine, the combination, with a turret, of a reciprocating turret moving slide, and a series of adjustable abutments connected with the turret and successively engaged by said slide, substantially as described.

8. In a screw machine, the combination, with a turret, of a reciprocating turret moving slide, a series of adjustable abutments corresponding to the series of tool sockets on the turret and arranged to be successively brought into the path of the slide by the indexing of the turret, substantially as described.

9. In a screw machine, the combination, with a turret, of a series of adjustable abutments connected therewith, screw rods for adjusting said abutments, a turret moving slide arranged to successively engage the abutments as the turret is indexed, and means for reciprocating said slide, substantially as described.

10. In a screw machine, the combination, with a turret slide, of a turret mounted therein, a circularly arranged series of abutments mounted on adjusting screws, a turret moving slide arranged to engage a fixed abutment on its return stroke and to engage one of said adjustable abutments on its forward stroke, and means for reciprocating said slide, substantially as described.

11. In a screw machine, the combination, with a turret slide, of a turret mounted therein with its axis in the direction of movement of the turret slide, a series of adjustable abutments arranged about the axis of said turret, and a reciprocating turret moving slide arranged to engage said abutments, substantially as described.

12. In a screw machine, the combination, with a turret, of a shaft for reciprocating the turret which makes one revolution for each reciprocation of the turret, a segment carried by said shaft provided with a toothed portion and a locking segment and a disk connected with the turret provided with a series of toothed segments and locking segments, substantially as described.

13. In a screw machine, the combination, with a turret slide, of a turret mounted therein, a shaft which makes one revolution for each reciprocation of the turret slide, a device operated by said shaft which has a uniform throw, connections between said device and the turret slide, and mechanism for indexing the turret from said shaft, substantially as described.

14. In a screw machine, the combination, with a turret slide, of a turret mounted therein, a shaft which makes one revolution for each reciprocation of the turret slide, a device operated by said shaft which has a uniform throw, connections between said device and the turret slide, mechanism for indexing the turret from said shaft, and a turret locking device operated from said shaft, substantially as described.

15. A cam-disk for controlling the speed of the turret-advancing mechanism, said cam-disk being provided with a series of pins projecting laterally from said disk and with cam-blocks adjustably clamped on said pins, substantially as described.

16. In a screw machine, the combination, with mechanism for reciprocating the turret, of a high speed driving mechanism, an independent slow speed driving mechanism, mechanism for alternately connecting said driving mechanisms, with the reciprocating mechanism, and means for varying the speed of the slow speed mechanism, and spindle controlling mechanism driven by said high speed mechanism, substantially as described.

17. In a screw machine, the combination, with a turret, a worm shaft 70 and connections for operating the turret, of a shaft 72, a high speed clutch sleeve mounted on said shaft 72, a slow speed clutch sleeve also mounted on shaft 72, a clutch intermediate said clutch sleeves, and gearing between said clutch and shaft 70, substantially as described.

18. In a screw machine the combination with mechanism for reciprocating the turret, of high speed driving mechanism, an independent slow speed mechanism, mechanism for alternately connecting said driving mechanisms with the reciprocating mechanism, means for varying the speed of the slow speed mechanism, and mechanism for controlling the stock driven by the high speed mechanism, substantially as described.

19. In a screw machine the combination with a turret, of a slide having a uniform reciprocation through which motion is transmitted to the turret, and means for varying the extent to which said slide moves the turret for different tools, substantially as described.

20. In a screw machine the combination with a turret, of a slide having a uniform reciprocation through which motion is transmitted to the turret, a series of adjustable devices corresponding to the sockets in the turret for determining the extent to which said slide moves the turret, substantially as described.

21. In a screw machine the combination with a turret, of a rotary device having a uniform throw, a device given a uniform reciprocation thereby, connections between said reciprocating device and the turret for varying the extent to which said device moves the turret for different tools, substantially as described.

22. In a screw machine the combination with the turret provided with sockets, of a sleeve mounted in one of said sockets, a spindle mounted to revolve in said sleeve, a gear on the rear end of said spindle, a shaft to which the turret is secured, a driving sleeve loosely mounted on said shaft and gearing between said driving sleeve and spindle gear, substantially as described.

GEORGE H. NEWTON.

Witnesses:
 W. H. THURSTON,
 J. H. THURSTON.